(12) United States Patent
Miyao et al.

(10) Patent No.: US 8,851,687 B2
(45) Date of Patent: Oct. 7, 2014

(54) REFLECTING PLATE AND REFLECTING FRAME

(75) Inventors: Hiroyuki Miyao, Tokyo (JP); Toshio Hosogai, Ibaraki (JP); Michiaki Ezure, Ibaraki (JP)

(73) Assignee: Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 13/236,956

(22) Filed: Sep. 20, 2011

(65) Prior Publication Data

US 2012/0154942 A1 Jun. 21, 2012

(30) Foreign Application Priority Data

Dec. 20, 2010 (JP) ................................. 2010-282954

(51) Int. Cl.
*G02B 5/124* (2006.01)

(52) U.S. Cl.
USPC ........................................................... 359/530

(58) Field of Classification Search
USPC ................................................. 359/529, 530
See application file for complete search history.

(56) References Cited

U.S. PATENT DOCUMENTS

| | | | |
|---|---|---|---|
| 6,480,187 B1 | 11/2002 | Sano et al. | |
| 6,504,532 B1 | 1/2003 | Ogasahara et al. | |
| 7,425,075 B1 * | 9/2008 | Hubbell | 359/530 |

FOREIGN PATENT DOCUMENTS

| | | |
|---|---|---|
| JP | 11-184618 A | 7/1999 |
| JP | 2002-132435 A | 5/2002 |
| JP | 2005-149321 A | 6/2005 |
| JP | 2005-228247 A | 8/2005 |
| JP | 3931030 A | 3/2007 |
| JP | 3986710 A | 7/2007 |
| JP | 2010-125813 A | 6/2010 |

OTHER PUBLICATIONS

Japanese Office Action received in Japanese Application No. 2010-282954 dated May 27, 2014.

* cited by examiner

*Primary Examiner* — Euncha Cherry
(74) *Attorney, Agent, or Firm* — Mattingly & Malur, PC

(57) ABSTRACT

An incident angle when illumination light from a position detecting device enters a reflecting surface may be large in some cases. In such cases, the retro-reflection rate of a reflecting surface having a prism structure decreases, leading to a cause of erroneous detection. In order to solve this problem, provided is a reflecting plate including a reflecting surface that retro-reflects illumination light emitted from an optical position detecting device towards the position detecting device that includes a light source, the reflecting plate further including: a surface structure in which a concavo-convex pattern having the same triangle shape in cross-section in a width direction of the reflecting plate continuously appears in a longitudinal direction thereof; and a retro-reflecting layer in which reflecting beads are evenly placed on at least one oblique surface of the concavo-convex pattern.

8 Claims, 15 Drawing Sheets

Image sensor (Right) Image-pickup screen

Image sensor (Left) Image-pickup screen

Image sensor (Right) Image-pickup screen

Image sensor (Left) Image-pickup screen

REFLECTING PLATE AND REFLECTING FRAME

BACKGROUND OF THE INVENTION

1. Field of the Invention

The present invention relates to a reflecting plate used together with an optical position detecting device and a reflecting frame including the reflecting plate on a reflecting surface thereof.

2. Background Art

In recent years, an interactive white board (IWB) has been increasingly adopted. The IWB can display, on a screen thereof, results similar to drawing of characters or the like on a blackboard with chalk using a finger, an electronic pen, or other means as an input object. In addition, the IWB can also detect an operation input using the input object as a mouse input.

The IWB is formed of the combination of a display device and a coordinate input device. Examples of the input object include a finger, a stylus pen, and an electronic pen. Examples of the display device include a plasma display panel (PDP), a liquid crystal display (LCD), and a projector. Examples of the coordinate input device include position detecting devices of a tablet type, a touch panel type, an electromagnetic induction type, an ultrasonic type, and an optical type. Note that, in any coordinate input devices, an arithmetic device such as a computer is used to calculate coordinates of the input object.

The present specification focuses attention on a coordinate input device that adopts an optical position detecting technique in which an image of the input object is picked up by an image sensor. The number of adopted coordinate input devices including the image sensor is increasing year after year due to an excellent drawing responsiveness and a strong resistance to external noise such as infrared rays, solar rays, and a change in temperature.

JP Patent Nos. 3931030 and 3986710 are exemplified as patents relating to an interactive white board that adopts the coordinate input device including the image sensor. The coordinate input device of this type is formed of the combination of a position detecting device and a retro-reflecting plate.

The position detecting device of this type includes an image sensor, a light source unit, and a control board (arithmetic device). The image sensor is attached to a periphery of a position detecting surface. If two or more image sensors are provided, an image of the input object on the position detecting surface can be picked up at a plurality of points of view. The control board receives the picked-up image from the plurality of image sensors, and calculates the position of the input object according to the principle of triangulation.

The light source unit is formed of a group of a plurality of light sources such as LEDs, and is placed in the vicinity of each image sensor. Each LED emits a light ray to retro-reflecting plates that are placed so as to surround the position detecting surface. Note that, a reflecting tape having a surface on which a retro-reflective minute structure such as a prism structure is placed is generally used as the retro-reflecting plate. The light ray emitted from the LED is reflected on the retro-reflecting tape back towards the LED that is a light source. The image sensor receives this reflected light. That is, an image of the total length of the reflecting tape is picked up. Note that, when the input object approaches the position detecting surface, the input object blocks the emitted light. The portion of this blocked light is detected as a shade on the picked-up image.

The control board (arithmetic device) calculates the position of the input object on the position detecting surface on the basis of the position of the shade appearing on a plurality of the picked-up images.

Incidentally, in a conventional position detecting device, a lens is generally placed on a light receiving surface thereof in order to enable the total length of the reflecting tape to fall within the image-pickup range of the image sensor. This is because the image-pickup angle of each light receiving element constituting the image sensor is as small as several millimeters to ten-odd millimeters. Note that, the lens needs to have a size suited to such a small light receiving element. In the past, a wide-angle lens having a small size did not exist. For this reason, a lens having an angle of view of approximately 90 degrees, which is easy to obtain, has been used in many cases as the image-pickup lens for the position detecting device.

Accordingly, the image sensors need to be placed at both right and left ends of the detecting surface. In actuality, the image sensor placed at the upper left corner can pick up images of the reflecting tape surfaces placed at the right side and the lower side of the detecting surface, but cannot pick up an image of the reflecting tape surface placed at the left side because the reflecting tape surface placed at the left side is outside of the angle of view. Similarly, the image sensor placed at the upper right corner can pick up images of the reflecting tape surfaces placed at the left side and the lower side of the detecting surface, but cannot pick up an image of the reflecting tape surface placed at the right side because the reflecting tape surface placed at the right side is outside of the angle of view.

Despite that, in the conventional device, as the area of the detecting surface is larger, a distance between the image sensor placed at the upper left corner and the image sensor placed at the upper right corner is larger. Accordingly, the casing size of the position detecting device (including two image sensors, two light source units, and a control board (arithmetic device)) is increased unfavorably. In addition, it is necessary to specially prepare the position detecting device in accordance with the size of the detecting surface.

In order to solve this technical problem, the applicant(assignee) of the present application have proposed a position detecting device not depending on the size of a position detecting surface (JP Patent Application No. 2010-125813 A). Specifically, the applicant(assignee) of the present application have proposed a position detecting device having the horizontal length that can be shorter than the horizontal size of the position detecting surface.

The achievement of this position detecting device enables one position detecting device to be used in a coordinate input device having an arbitrary detecting surface size. Meanwhile, in a prism structure (a structure including a trihedral prism element) constituting a reflecting tape surface, conditions of the incident angle that allows light to be retro-reflected is relatively strict unfortunately. Particularly near lower ends on the respective right and left sides of the position detecting surface, the incident angle of illumination light may exceed a range that allows the light to be retro-reflected.

SUMMARY OF THE INVENTION

As a result of intensive studies on such a technical problem, the inventors of the present invention have invented one including the following elements, as a reflecting plate including a reflecting surface that retro-reflects illumination light emitted from an optical position detecting device towards the position detecting device that includes a light source:

(1) a surface structure in which a concavo-convex pattern having the same triangle shape in cross-section in a width direction of the reflecting plate continuously appears in a longitudinal direction thereof; and
(2) a retro-reflecting layer in which reflecting beads are evenly placed on at least one oblique surface of the concavo-convex pattern.

According to the present invention, it is possible to provide a reflecting plate whose placement conditions that allows light to be retro-reflected are not strict, while costs thereof are lower than the conventional structure.

DETAILED DESCRIPTION OF THE PREFERRED EMBODIMENTS

Hereinafter, embodiments of a reflecting plate and a reflecting frame according to the present invention are described with reference to the drawings. Note that, the following embodiments are used only for describing the present invention, and various embodiments obtained by combining generally or publicly known techniques and functions can be conceived when the present invention is actually carried out.

Embodiment 1

Structure of Reflecting Surface

Figure 1:
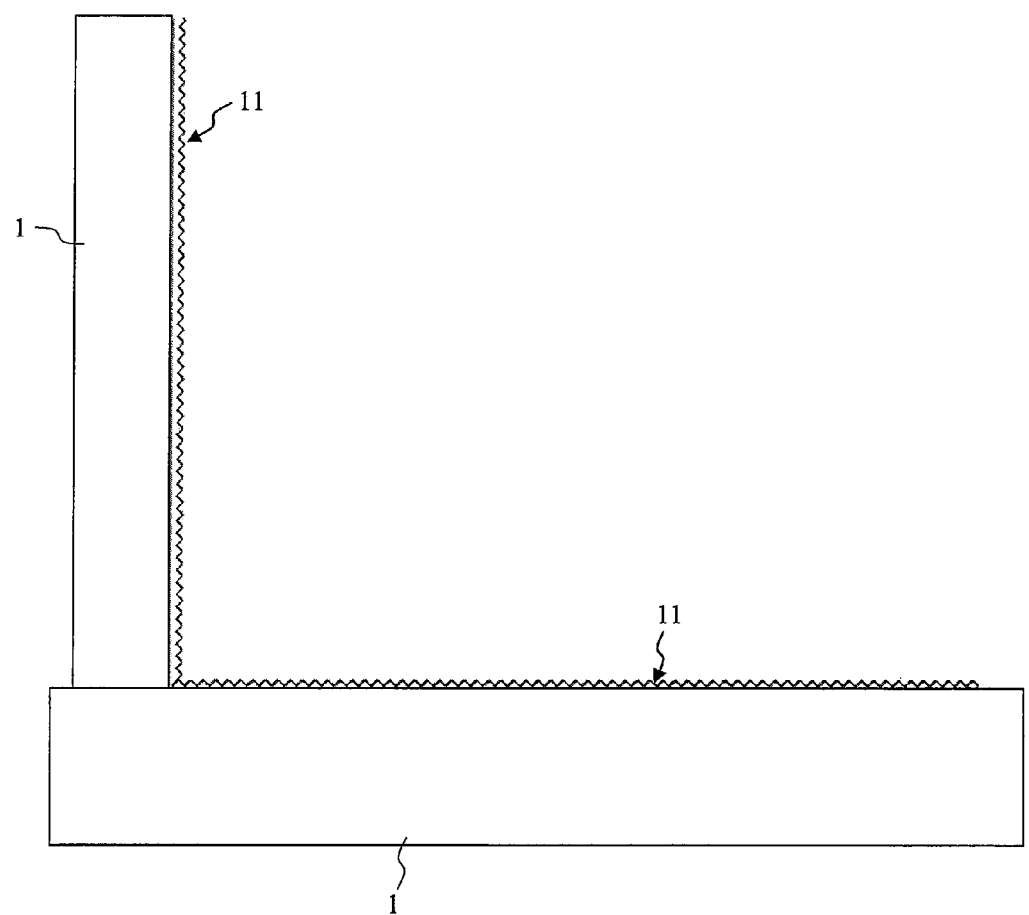
FIG. 1 is a view for describing part of a reflecting frame and a reflecting surface constituting an interactive white board system.

FIG. 1 illustrates a cross-sectional structure example of a reflecting frame 1 that is preferably applied to an interactive white board system and a reflecting surface 11 of the reflecting frame 1. In the present embodiment, a structure in which a reflecting plate to be described later is attached to a frame body is referred to as the reflecting frame. FIG. 1 is a view from a user side. In addition, a position detecting surface is assumed to be parallel to the plane of FIG. 1. The reflecting frame 1 is placed at each of the left side, the lower side, and the right side of the position detecting surface. In FIG. 1, only the reflecting frames 1 placed at the left side and the lower side are illustrated. Although not illustrated, a position detecting device (including an illumination light source, an image sensor, and a coordinate arithmetic device; to be described in detail later) is placed at the upper side of the position detecting surface.

Figure 2:
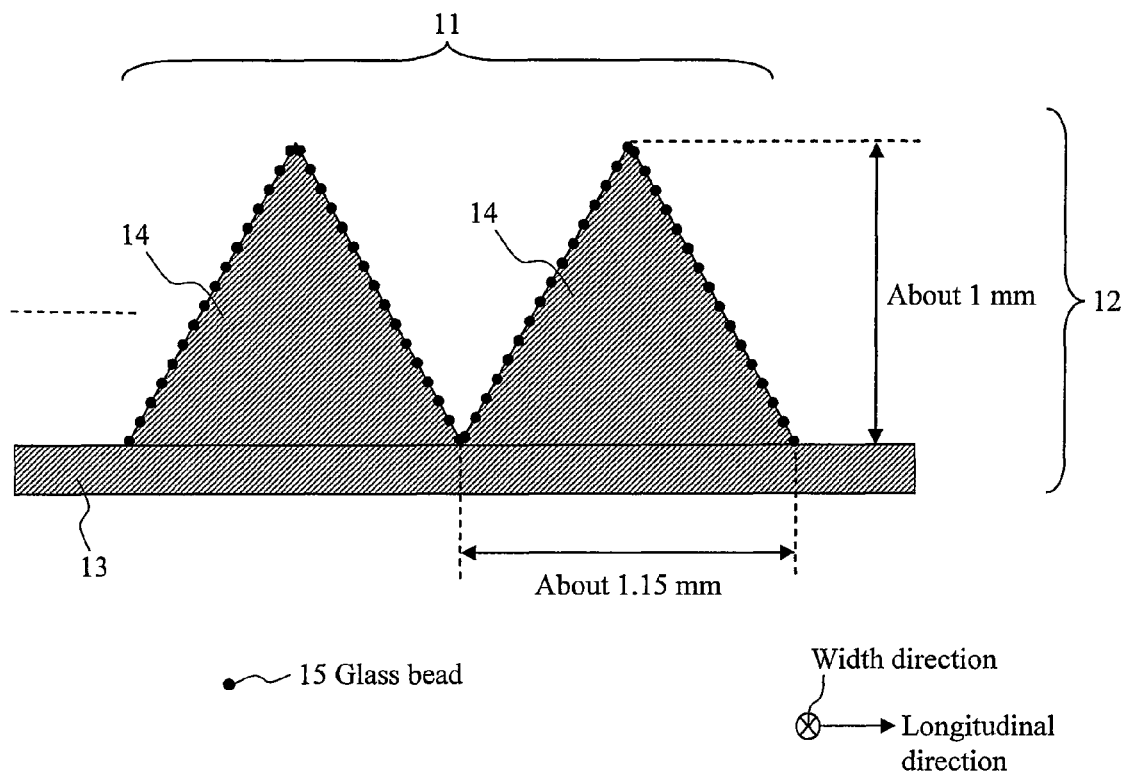
FIG. 2 is an enlarged cross-sectional view of the reflecting plate constituting the reflecting frame (convex shape).
Figure 3:
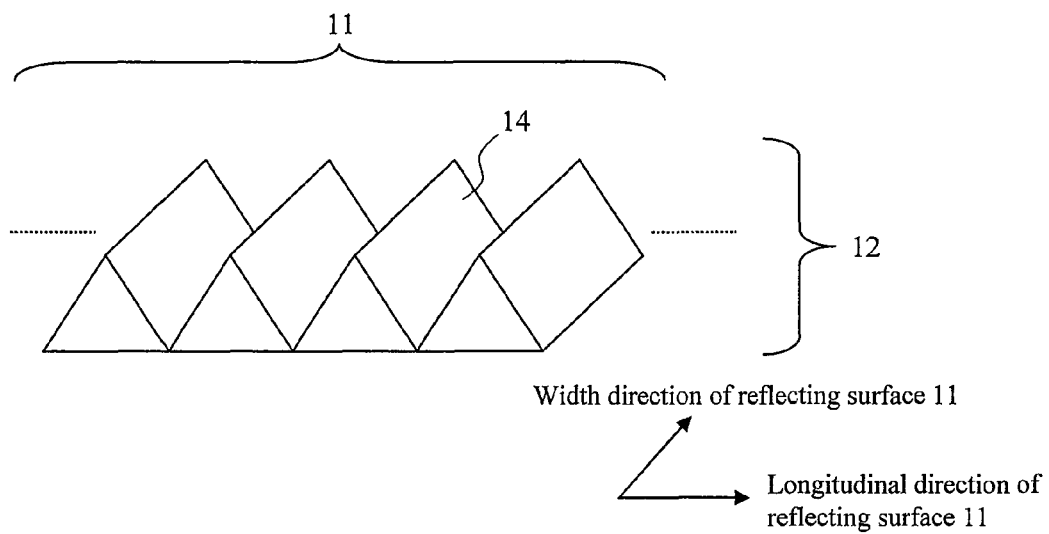
FIG. 3 is an enlarged perspective view of the reflecting plate constituting the reflecting frame.

As illustrated in FIG. 1, the reflecting surface 11 of the reflecting frame 1 according to the present embodiment is formed on a surface of a concavo-convex pattern that continuously extends in the longitudinal direction. FIG. 2 and FIG. 3 are partial enlarged views each illustrating a reflecting plate 12 constituting the reflecting surface 11. FIG. 2 illustrates a cross-sectional structure when the reflecting surface 11 is observed in the direction perpendicular to the position detecting surface (the direction perpendicular to the plane of FIG. 1). FIG. 3 is a view when the reflecting surface 11 is observed obliquely from the top.

As illustrated in FIG. 2 and FIG. 3, the reflecting plate 12 has a structure in which triangular prisms (convex patterns 14) each having an equilateral triangle shape in cross-section are aligned on a surface of a flat base layer (surface) 13 in a line. In the present specification, the shape of a foundation on which the reflecting surface 11 (or "retro-reflecting layer") is formed is referred to as a surface structure of the reflecting plate 12. In the present embodiment, the height of the equilateral triangle is about 1 mm. In this case, the length of one side thereof is about 1.15 mm. As a matter of course, the dimensions of the equilateral triangle given here are a mere example, and excellent retro-reflecting properties can be generally obtained as long as the height thereof is around 1 mm.

Minute glass beads 15 are evenly placed on each oblique line of the convex pattern 14 (hereinafter, a side of the convex pattern 14 in contact with the base layer 13 is referred to as a base). That is, the glass beads 15 that function as reflecting beads are placed on an entire oblique surface of the convex pattern 14. Similarly to a prism structure, the glass beads 15 are known as a retro-reflecting member, and the structure thereof is simpler than the prism structure. Accordingly, the reflecting plate 12 of the present embodiment has a simpler structure compared with the case of using a reflecting surface all over which minute prism structures are placed, and thus can be produced at lower cost.

In the present embodiment, the diameter of the glass bead 15 is about 70 µm. As a matter of course, the diameter of the glass bead 15 is not limited to this value, and may be smaller or larger than this value. For example, the diameter thereof may be between 60 µm and 80 µm. Note that, for example, a centrifugal sedimentation method, a laser analysis method, and an electrical detection method are used to measure the diameter thereof.

It is illustrated in FIG. 2 as if the glass beads 15 are placed directly on the surface of the convex pattern 14, but in actuality, a structure may be adopted in which a retro-reflecting tape on which the glass beads 15 are evenly placed is attached to the oblique surface of the convex pattern 14. Alternatively, a structure may be adopted in which the glass beads 15 are applied or adhered to the surface of the convex pattern 14 via an adhesive resin. Note that, the retro-reflecting level of the glass bead 15 does not remarkably change up to an incident angle of 47° to a flat surface serving as the foundation. On the other hand, in the case of the prism structure, the incident angle (the incident angle to the arrangement surface of the prism structure) that allows light to be retro-reflected is smaller compared with the glass bead 15.

Figure 4:
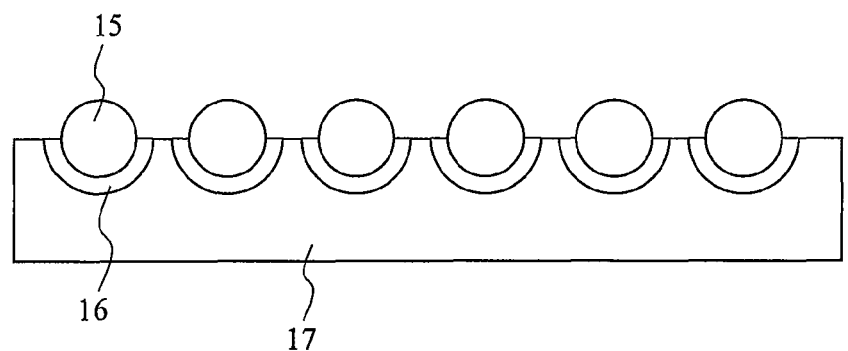
FIG. 4 is a view illustrating a structure example of an exposed (open) lens type retro-reflecting tape.
Figure 5:
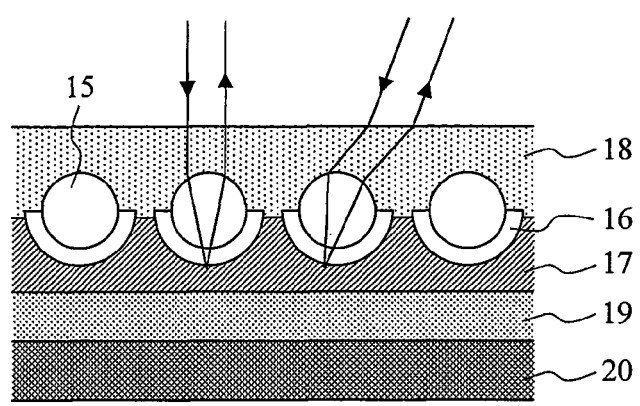
FIG. 5 is a view illustrating a structure example of an enclosed (closed) lens type retro-reflecting tape.
Figure 6:
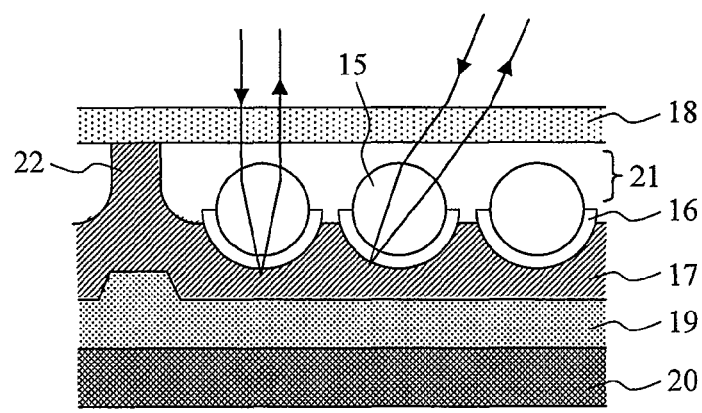
FIG. 6 is a view illustrating a structure example of an encapsulated lens type retro-reflecting tape.

FIG. 4, FIG. 5, and FIG. 6 each illustrate a structure example of a retro-reflecting tape in which the glass beads 15 are used in the retro-reflecting layer. FIG. 4 corresponds to a retro-reflecting tape called an exposed or open type. In this case, the glass beads 15 each having a lower surface on which a hemispherical reflecting film 16 is placed are placed on a surface of a synthetic resin layer 17.

FIG. 5 corresponds to a retro-reflecting tape called an enclosed or closed type. In this case, a surface of each glass bead 15 is covered with a protecting film 18 called a top film. This structure has a property that a decrease in reflecting performance when dirt or water drops adhere to the surface is smaller than that of the exposed type. Note that, FIG. 5 also illustrates an adhesive layer 19 as a layer below the synthetic resin layer 17 and release paper 20 as a protecting film of the adhesive layer 19.

FIG. 6 corresponds to a retro-reflecting tape called an encapsulated lens type. This structure is an improved example of the enclosed type. Specifically, an air layer 21 is characteristically provided between the glass beads 15 and the protecting film 18. Note that, supporting columns 22 for supporting the protecting film 18 are placed at appropriate intervals. With this structure, the luminance of reflected light is higher than that of the enclosed type.

(Relation Between Angle of Reflecting Surface and Incident Angle)

Next, the relation between the angle of the reflecting surface and the incident angle is described. Note that, in general, in the case of the same amount of incident light, the amount of retro-reflected light tends to be larger as the incident angle is smaller.

Figure 7A:
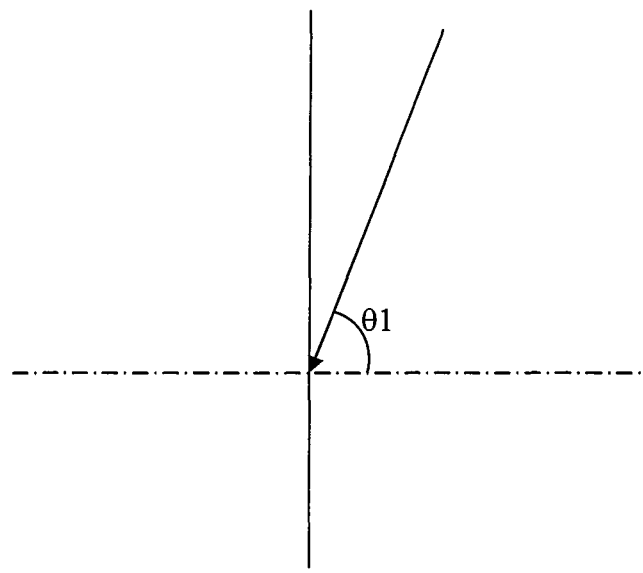
FIGS. 7A, 7B, and 7C are views for describing the relation between the structure of a reflecting surface and an incident angle.

FIG. 7A illustrates a foundation structure for the reflecting surface, which is adopted in the conventional system. In this case, the incident angle to the foundation surface is $\theta 1$. The light incidence relation illustrated in FIG. 7A is likely to be observed near lower ends on the respective right and left sides of the interactive white board system. In the case where the incident angle $\theta 1$ is large as illustrated in FIG. 7A, the retro-reflecting surface of the prism structure cannot reflect the incident light with sufficiently large luminance.

Figure 7B:
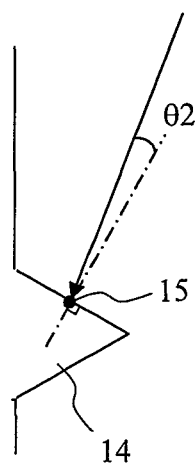

FIG. 7B illustrates an incident angle $\theta 2$ of illumination light according to the present embodiment. That is, FIG. 7B illustrates the incident angle $\theta 2$ when the cross-section of the convex pattern 14 serving as the foundation of the reflecting surface is an equilateral triangle. Note that, the emitting angle of the illumination light from the light source is the same as FIGS. 7A and 7B. In the case as illustrated in FIG. 7B where the foundation of the reflecting surface 11 is processed into the equilateral triangle, the incident angle to the reflecting surface 11 is extremely small even if the illumination light is emitted at the same angle. This is because the reflecting surface stands up so as to be closer to be perpendicular to the incident direction of the illumination light.

In the case as in the present embodiment where the cross-sectional shape is the equilateral triangle, even if the incident angle $\theta 1$ is nearly 90°, the incident angle $\theta 2$ is 30° at the largest. On the other hand, even if the incident angle $\theta 1$ is nearly 0°, the incident angle $\theta 2$ is 30° at the largest. In this way, in the case where the cross-sectional shape of the convex pattern 14 is the equilateral triangle, the maximum value of the incident angle $\theta 2$ is 30°. The adoption of the reflecting surface structure according to the present embodiment makes it possible to substantially remove the limitation on the range within which the reflecting plate 12 can be attached.

Unfortunately, if the incident angle $\theta 1$ is large, the convex pattern 14 near the light source blocks the illumination light from entering the convex pattern 14 far from the light source. That is, a shade occurs. For this reason, it is desirable that the height of the convex pattern 14 be low. Meanwhile, if the height thereof is lower, the length of one side of the equilateral triangle is naturally shorter. That is, the size of the convex pattern 14 is smaller. On the other hand, if the size of the convex pattern 14 is small, processing accuracy of the convex pattern 14, an influence of the film thickness of the retro-reflecting tape, and a decrease in tape strength cannot be ignored. Accordingly, in the present embodiment, the height of the convex pattern 14 is about 1 mm. Note that, it is preferable that the height of the convex pattern 14 be between 0.5 mm and 1.2 mm, and the height thereof may be, for example, 0.8 mm or 0.9 mm.

(Other Shapes Preferably Applied to Reflecting Surface)

Figure 7C:
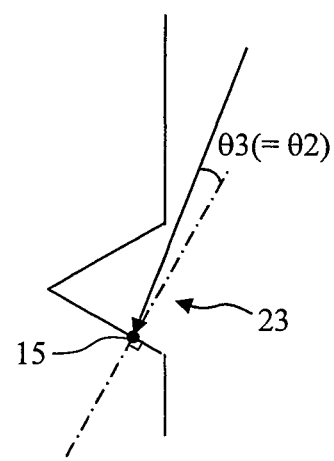
Figure 8:
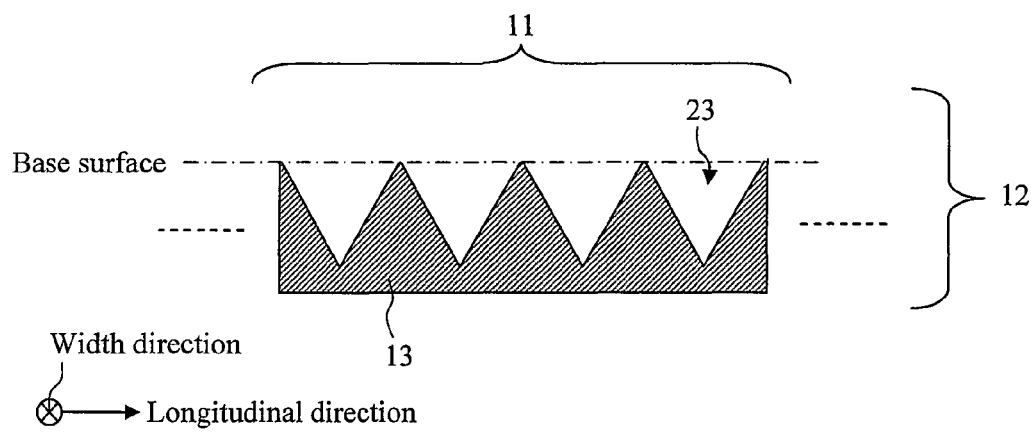
FIG. 8 is an enlarged cross-sectional view of the reflecting plate constituting the reflecting frame (concave shape).

The incident angle $\theta 2$ illustrated in FIG. 7B can be achieved also by other pattern than the convex pattern 14. FIG. 7C illustrates the case where the reflecting surface 11 is formed on a surface of a concave pattern 23 having an equilateral-triangular cross-sectional structure (groove structure). In this case, an incident angle $\theta 3$ (=$\theta 2$) that is the same as that of the structure illustrated in FIG. 7B can be obtained, except that the illumination light enters the oblique surface on the far side from the light source. As is apparent from the above-mentioned relation, the foundation structure of the reflecting surface is not limited to the convex pattern, and may be the concave pattern. Accordingly, as illustrated in FIG. 8, the reflecting plate 12 in which the concave pattern 23 is continuously formed on the surface of the base layer 13 may be adopted.

Figure 9:
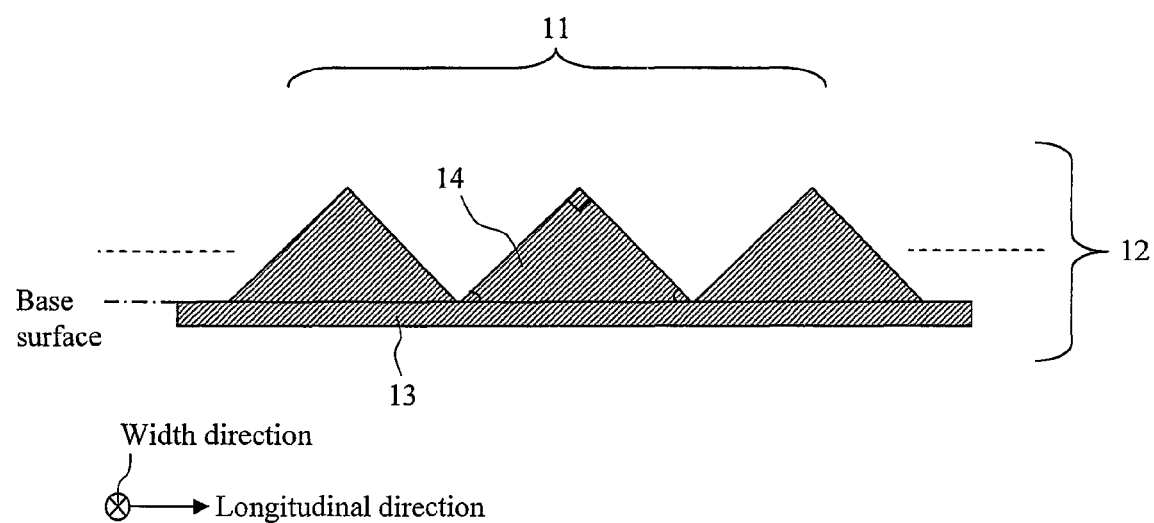
FIG. 9 is an enlarged cross-sectional view of the reflecting plate constituting the reflecting frame (another shape).

Alternatively, as illustrated in FIG. 9, the surface shape of the reflecting surface 11 may be an isosceles right triangle shape in cross-section. With this shape, the height of the convex pattern 14 can be lower than that when the cross-section is the equilateral triangle, and hence the occurrence of a shade can be suppressed. In addition, the isosceles right triangle is a left-right symmetrical shape similarly to the equilateral triangle. Accordingly, whether the light source of the illumination light is located on the right side or on the left side of the figures, the same retro-reflecting performance can be achieved for both the right and left sides. In the case where the cross-sectional shape of the foundation on which the reflecting surface 11 is formed is left-right symmetrical, the attachment direction of the reflecting surface 11 to the reflecting frame 1 does not need to be considered, leading to a reduction in production cost.

Figure 10A:
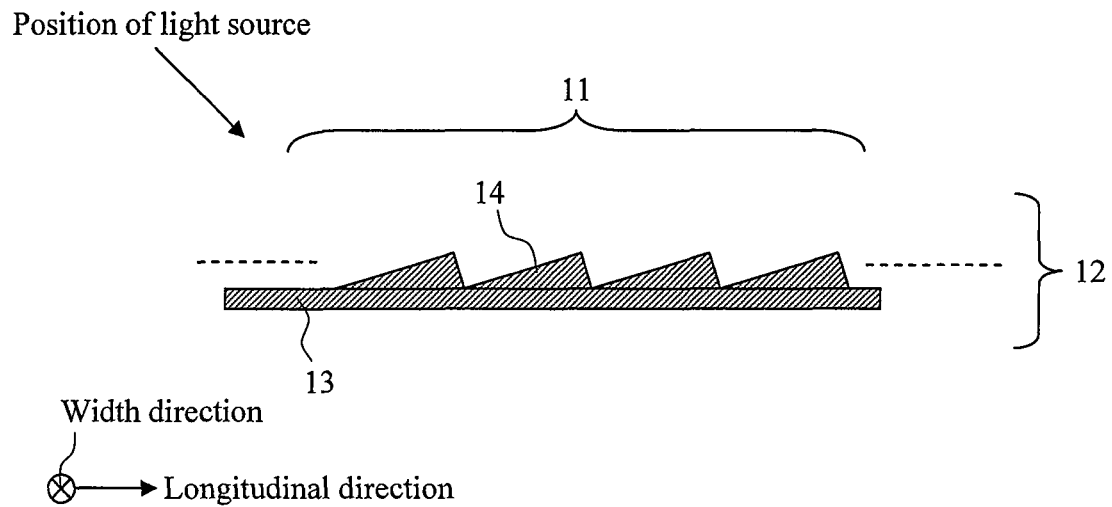
FIGS. 10A and 10B are enlarged cross-sectional views of the reflecting plate constituting the reflecting frame (still another shapes).
Figure 10B:
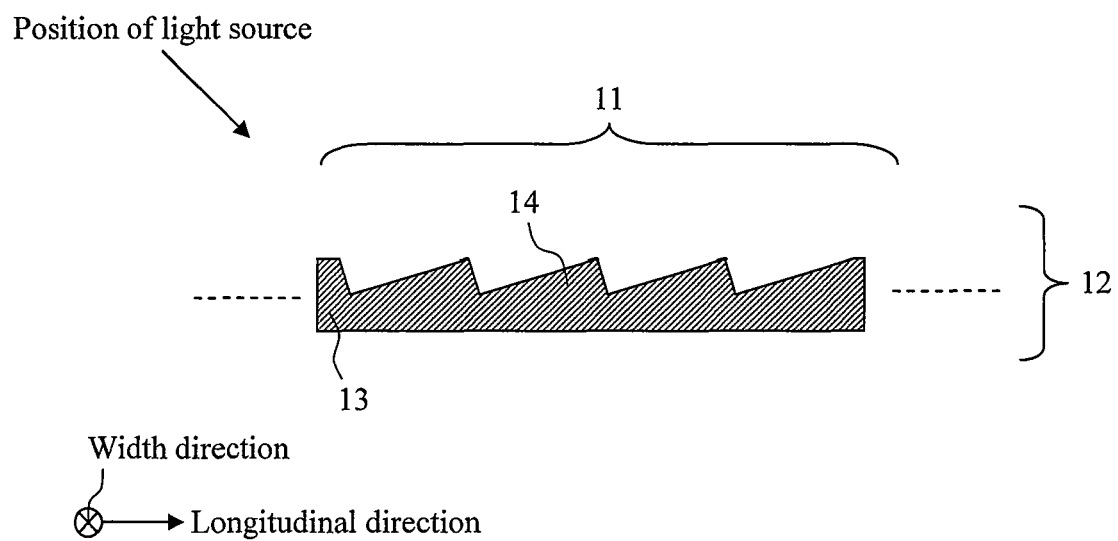

Conversely, in the case where the position of the light source with respect to the reflecting surface 11 is determined in advance, as illustrated in FIGS. 10A and 10B, the length of an oblique surface facing the light source may be set to be longer than the length of an opposite oblique surface. FIG. 10A illustrates an example of the convex pattern, and FIG. 10B illustrates an example of the concave pattern. In this case, the height (depth) of the pattern can be low (shallow), whereby an influence of a shade can be reduced. As a matter of course, similarly to the above-mentioned structure examples, the minute glass beads 15 are evenly placed on the reflecting surface 11. Note that, in the case as in this example where the incident direction of the illumination light is known in advance, the glass beads 15 may be placed only on the oblique surface that the illumination light enters. The same applies to the other structure examples.

(Conclusion)

As has been described hereinabove, in the reflecting plate 12 according to the present embodiment, the surface thereof is formed into the repetitive shape of the concavo-convex pattern having the same shape in the width direction, and the glass beads 15 are adopted as the retro-reflecting member thereof. The adoption of this configuration makes it possible to maintain an excellent retro-reflecting performance compared with the conventional case, even if the incident angle $\theta 1$ to the placement surface of the reflecting plate 12 is large.

Embodiment 2

In the present embodiment, description is given of an example in which the reflecting plate 12 described in Embodiment 1 is applied to the interactive white board system.

Figure 11A:
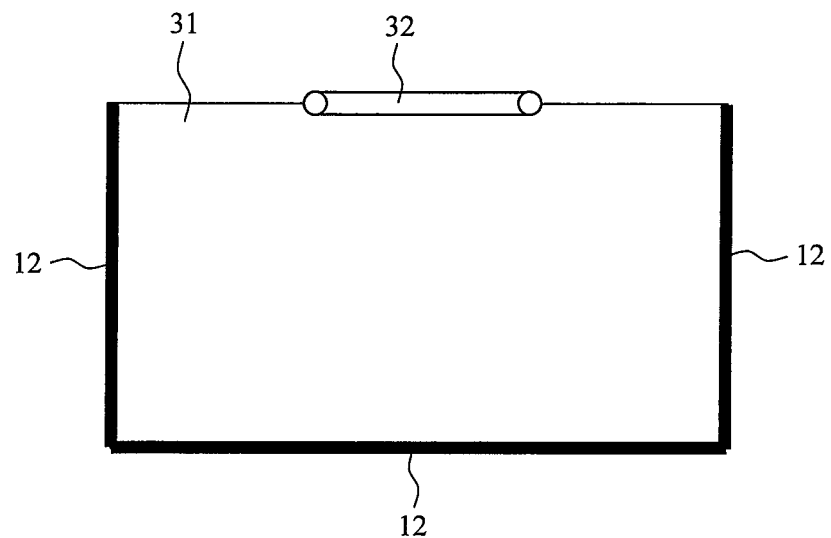
FIGS. 11A and 11B are views for describing a placement structure example of the reflecting plate.

FIG. 11A illustrates an attachment example of the reflecting plate 12 when a position detecting device 32 is placed near the center of the upper side of a position detecting surface 31. In FIG. 11A, the reflecting plate 12 is attached to each of three sides, that is, the left side, the right side, and the lower side of the position detecting surface 31. Note that, the reflecting plate 12 is placed such that the concavo-convex pattern having the triangle shape in cross-section appears continuously in an extending direction of each side as illustrated in FIG. 1. In this case, the position detecting accuracy near lower portions on the respective right and left sides, which may decrease in some cases in the prism structure, can be increased.

Figure 11B:
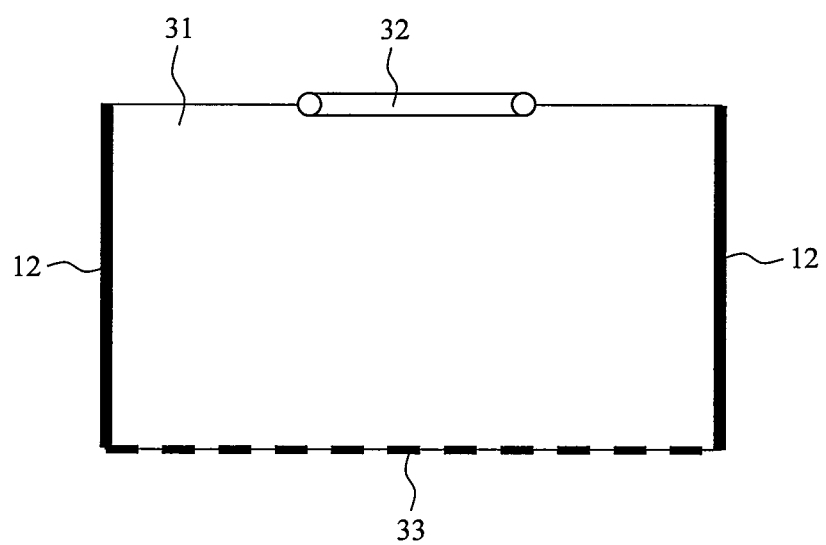

As illustrated in FIG. 11A, the incident angle $\theta 1$ is generally larger in the lower portions on the respective right and left sides, resulting in the occurrence of a position detecting error. On the other hand, the incident angle $\theta 1$ to the lower side of the position detecting surface 31 is not large enough to cause the position detecting error. Accordingly, as illustrated in FIG. 11B, the reflecting plate 12 in which the glass beads 15 are placed on the surface of the concavo-convex pattern processed into the triangle shape in cross-section may be used only for the right and left sides, and a reflecting plate 33 having the prism structure may be used for the lower side.

Embodiment 3

Hereinafter, description is given of configuration examples of the interactive white board system including the reflecting plate 12 described above.

(Interactive White Board System 1)

Figure 12:
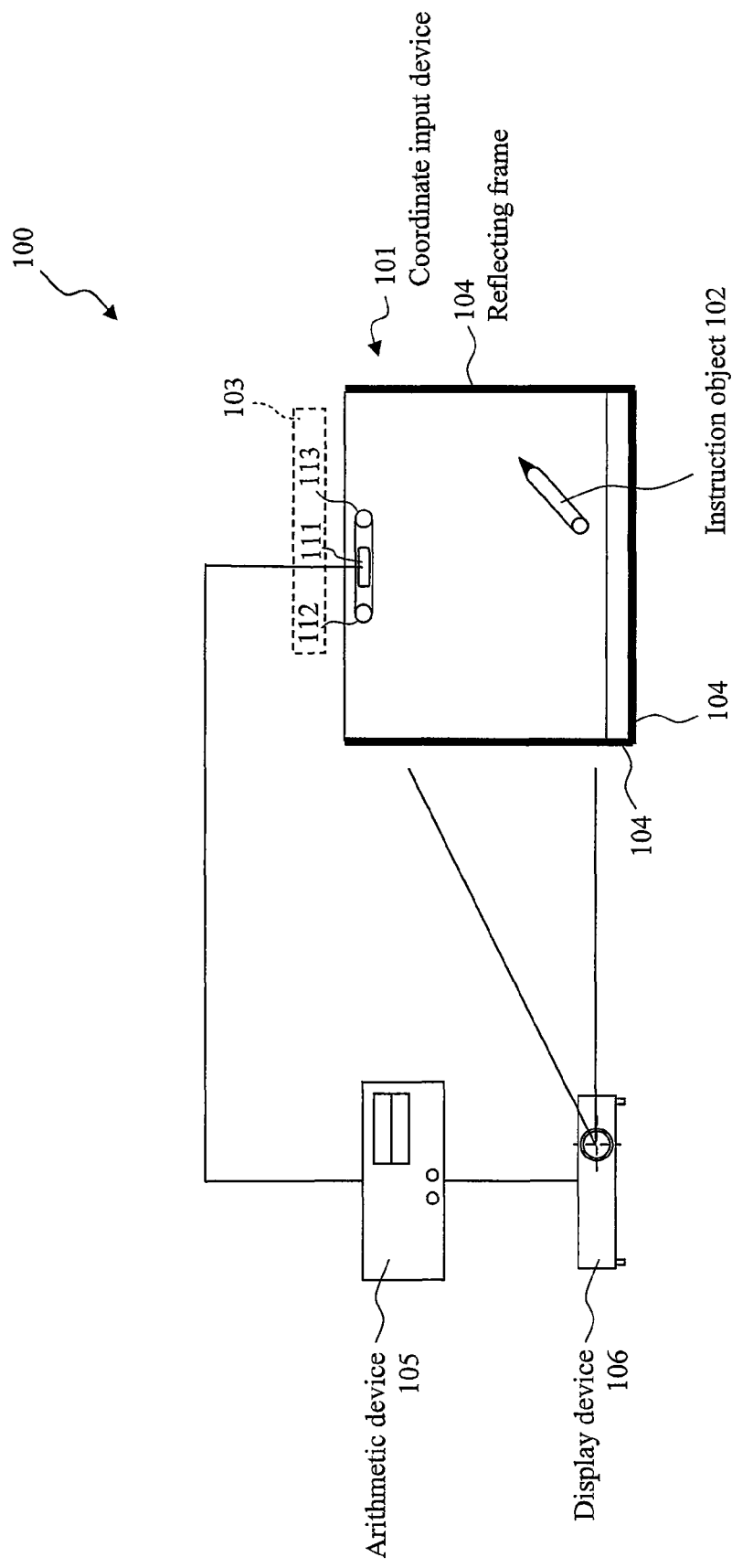
FIG. 12 is a view illustrating a configuration example of the interactive white board system.

FIG. 12 illustrates a basic configuration of the interactive white board system. The basic configuration illustrated in FIG. 12 is common to other configuration examples of the interactive white board system to be described later. An interactive white board system 100 includes a coordinate input device 101, an instruction object 102, an arithmetic device 105, and a display device 106.

The coordinate input device 101 includes a position detecting device 103 and a reflecting frame 104. The reflecting frame 104 corresponds to the reflecting frame 1 of FIG. 1, and a reflecting surface thereof is formed of the reflecting plate 12 described above. In the present embodiment, the position detecting device 103 is fixed to a frame body (not illustrated). The reflecting frame 104 defines an outer edge of each of the right side, the left side, and the lower side of the position detecting surface.

Figure 13:
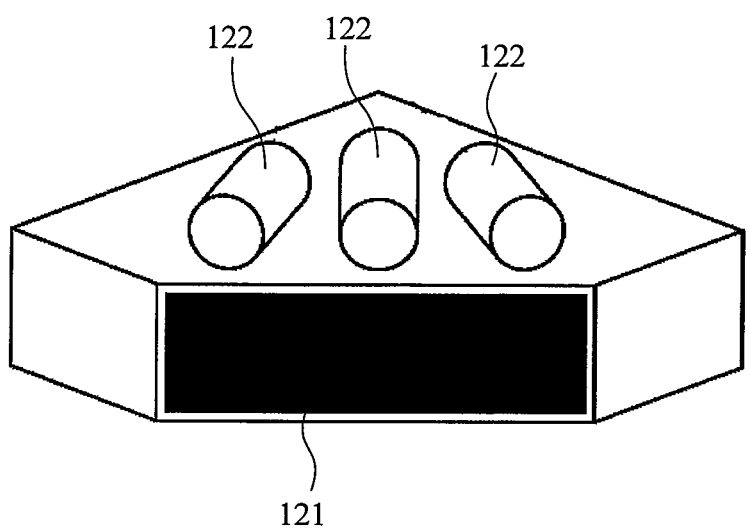
FIG. 13 is a view illustrating a structure example of an image-pickup unit.

The position detecting device 103 includes a control device 111, an image-pickup unit (left) 112, and an image-pickup unit (right) 113. FIG. 13 illustrates an internal structure example of the image-pickup units 112 and 113. As illustrated in FIG. 13, the image-pickup unit includes an image sensor 121 and a plurality of LEDs 122. The plurality of LEDs 122 are placed such that light therefrom can be emitted at a wide angle. In the present embodiment, the LED 122 is an infrared light source. A CCD sensor, a CMOS sensor, and other image-pickup elements are used as the image sensor 121. The image sensor 121 receives infrared light retro-reflected on the reflecting surface of the reflecting plate 12, and picks up an image corresponding to the reflecting surface.

Figure 14:
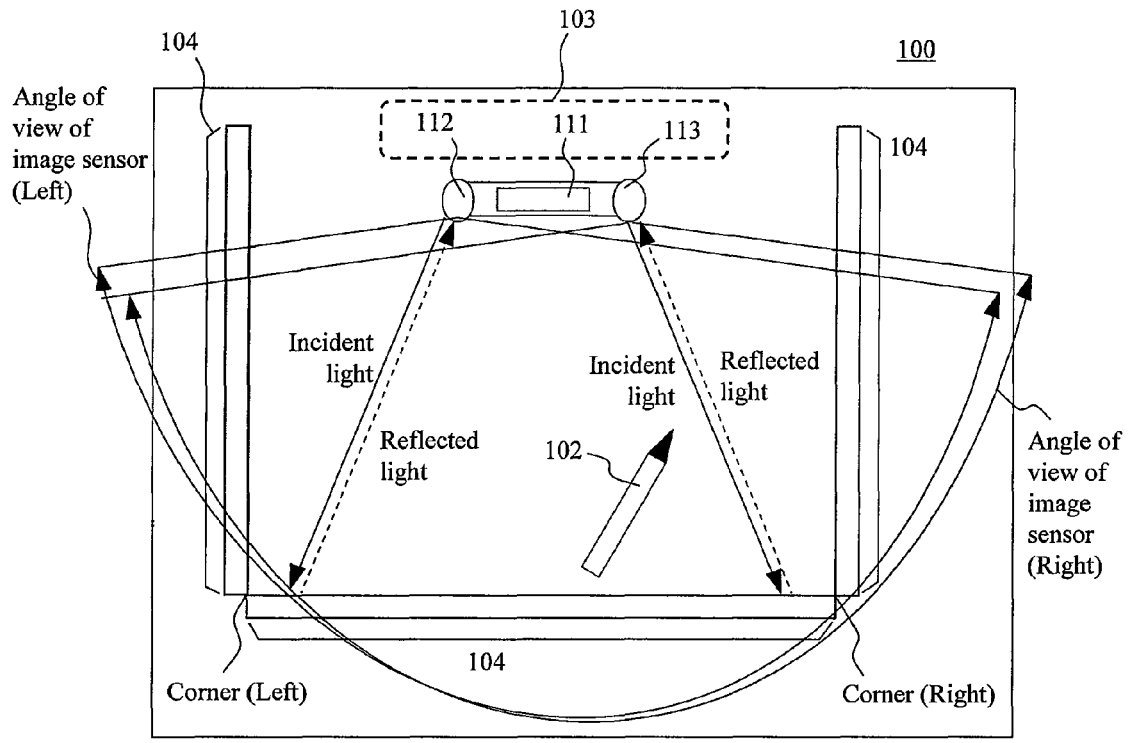
FIG. 14 is a view for describing a position detecting method of a position detecting device included in the system illustrated in FIG. 12.
Figure 14:
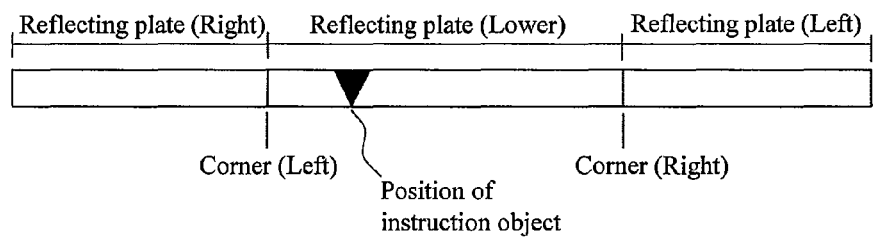
Figure 14:
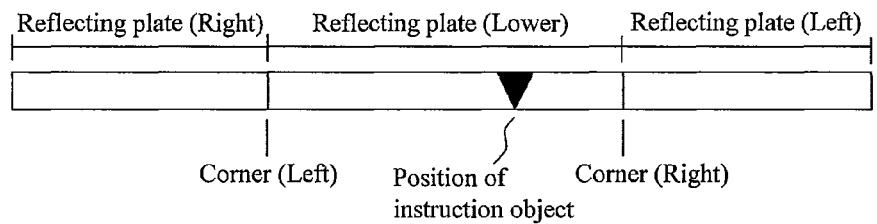

Note that, the angle of view of each of the image-pickup units 112 and 113 is about 180 degrees as illustrated in the upper part of FIG. 14. Accordingly, the image-pickup unit (left) 112 can pick up an image of the reflecting surface of the reflecting frame 104 that defines each of the left side, the lower side, and the right side of the position detecting surface. Similarly, the angle of view of the image-pickup unit (right) 113 is about 180 degrees. Accordingly, the image-pickup unit (right) 113 can also pick up an image of the reflecting surface of the reflecting frame 104 that defines each of the right side, the lower side, and the left side of the position detecting surface. The relation between the attachment position of each image-pickup unit and an image-pickup screen is illustrated in the lower part of FIG. 14. As illustrated in FIG. 14, an image of the instruction object 102 (in this case, a pen having a conical tip) blocking the infrared light is picked up as a shade on the image-pickup screen. Note that, the instruction object 102 may be a finger or a stick.

In the present embodiment, 180 degrees is given as an example of the angle of view, but the angle of view may be, for example, equal to or more than 160 degrees or may be another angle of view. In any case, the image-pickup ranges of the image-pickup units 112 and 113 cover both the right and left regions from the attachment positions thereof, and a region in which the two image-pickup ranges overlap each other is used as the position detecting surface. Note that, if triangulation is possible, the angle of view may be, for example, above 180 degrees.

Returning to the description of FIG. 12, the control device 111 calculates position coordinates (X, Y) of the instruction object 102 on the basis of the position of the shade appearing on the picked-up images of the image-pickup units 112 and 113. Here, the control device 111 calculates the position coordinates according to the principle of triangulation. Note that, the origin of coordinates is assumed to be at the upper left corner of the position detecting surface. The calculated position coordinates (X, Y) are transmitted as coordinate information to the arithmetic device 105 such as a computer.

The arithmetic device 105 generates drawing information (characters, lines, figures, and other information) on the basis of the received coordinate information, and outputs the drawing information to the display device 106. A projector may be used for the display device 106 as illustrated in FIG. 12, and alternatively, a flat display such as a PDP or an LCD may be used therefor.

(Interactive White Board System 2)

Figure 15:
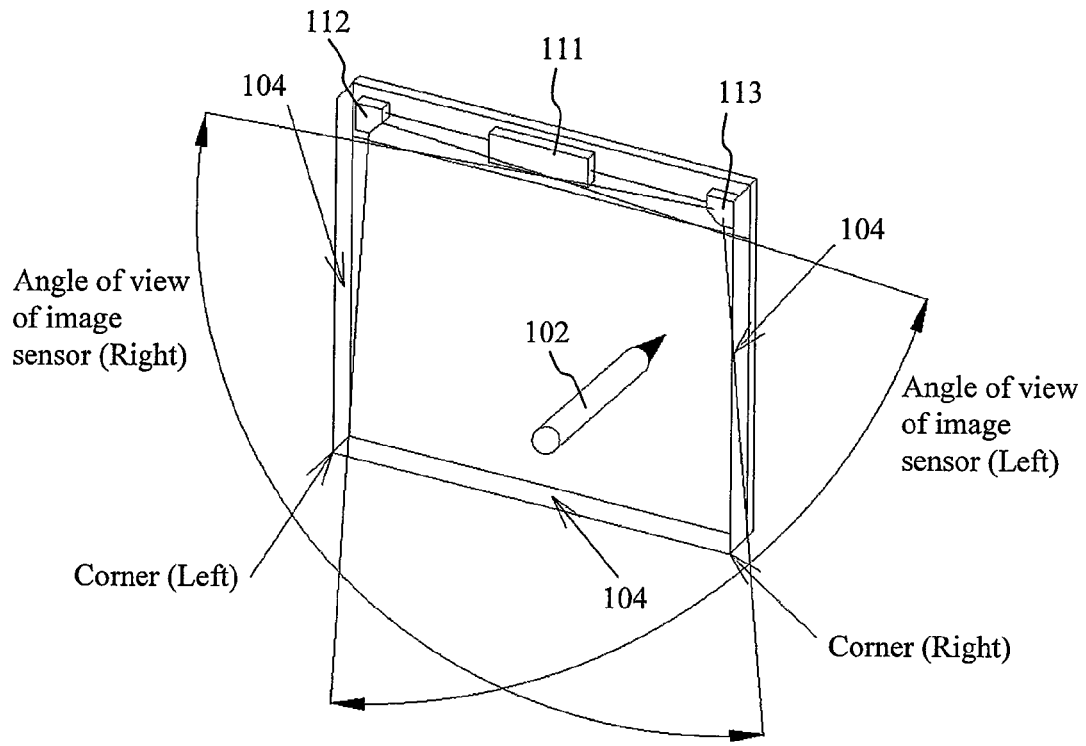
FIG. 15 is a view illustrating another configuration example of the interactive white board system.
Figure 15:
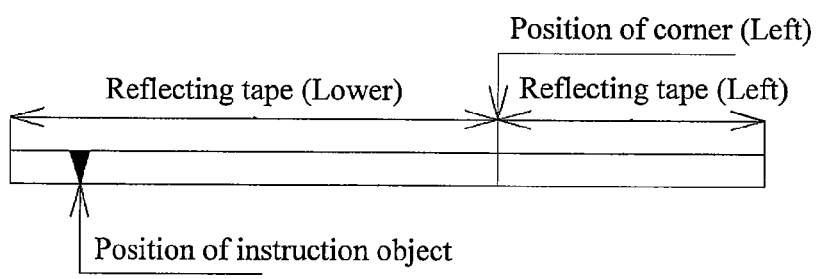
Figure 15:
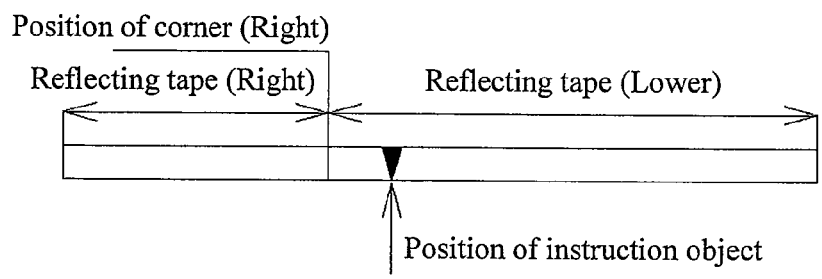

In the above-mentioned embodiment, it is assumed that the horizontal length of the position detecting device 103 is shorter than the length of a horizontal side of the position detecting surface. That is, description is given of the case where the image-pickup units 112 and 113 are located on the inner sides of the respective left and right ends of the position detecting surface. Alternatively, as illustrated in FIG. 15, the image-pickup units 112 and 113 may be located at the respective left and right ends of the position detecting surface.

In the case of this placement, both image-pickup ranges of the image-pickup units 112 and 113 may be about 90 degrees. Accordingly, the image-pickup unit (left) 112 picks up an image of the reflecting surface of the reflecting frame 104 that defines each of the lower side and the right side of the position detecting surface. On the other hand, the image-pickup unit (right) 112 picks up an image of the reflecting surface of the reflecting frame 104 that defines each of the left side and the lower side of the position detecting surface.

(Interactive White Board System 3)

In the above-mentioned two embodiments of interactive white board systems, it is assumed that the reflecting frame 104 is placed fixedly to the position detecting surface. In the present embodiment, description is given of an interactive white board system in which the reflecting plates 12 are united each other to thereby enable a user himself/herself to freely change the size of the position detecting surface. Here, the length of the reflecting plate 12 is set to a fixed value of, for example, 30 cm.

Figure 16:
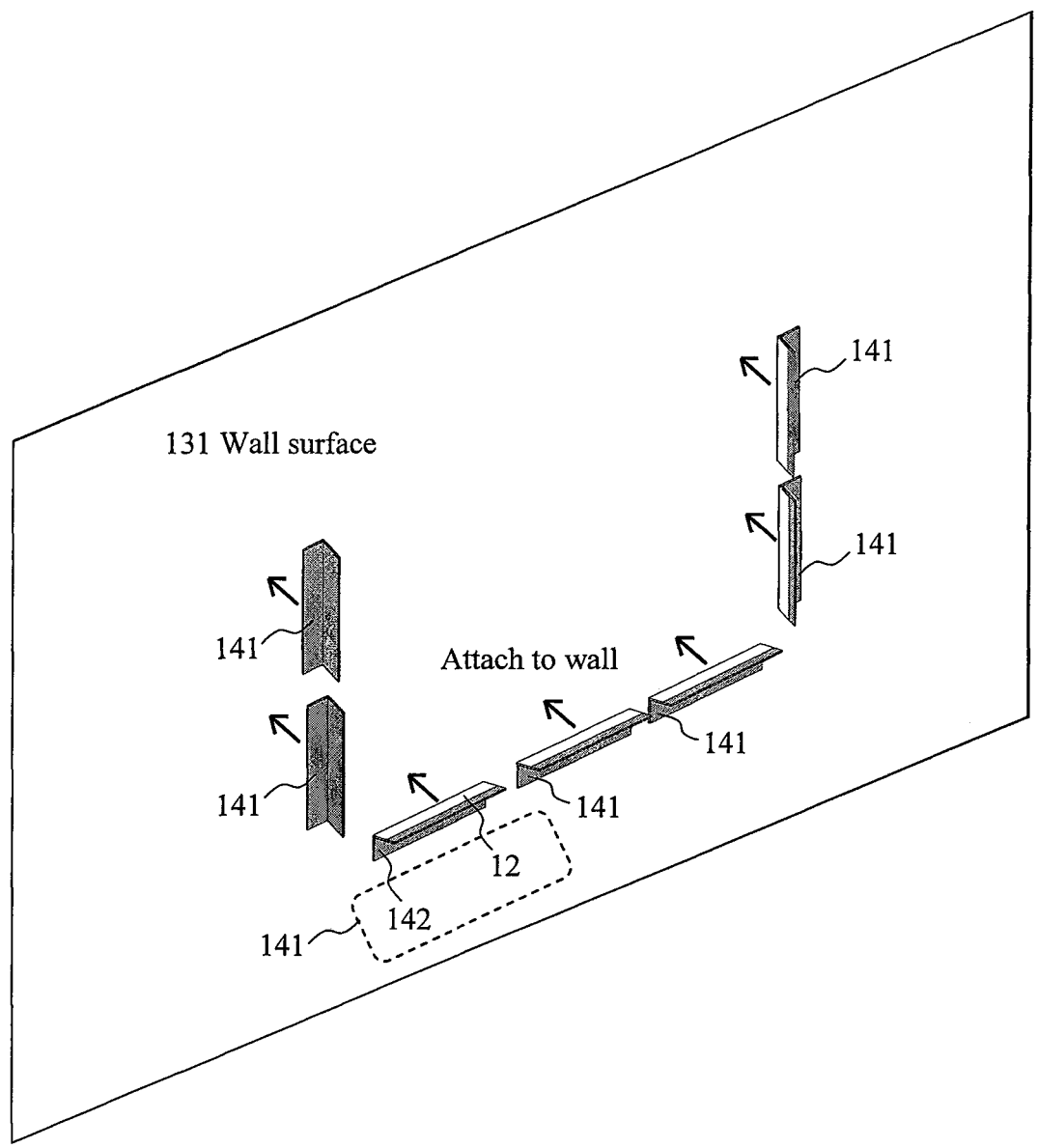
FIG. 16 is a view for describing an example in which unit-type reflecting plates are attached to a wall surface.

FIG. 16 illustrates an application example of a unit-type reflecting plate 141. The unit-type reflecting plate 141 illustrated in FIG. 16 has a structure in which the reflecting plate 12 (the reflecting plate proposed in the present specification) is attached to a main body 142 having an L-shape in cross-section. Note that, the reflecting plate 12 is attached to a casing surface placed perpendicularly to a wall surface 131. Further, in FIG. 16, the reflecting plate 12 is placed on the side closer to the wall surface. The rear surface of the unit-type reflecting plate 141 is flat.

Figure 17:
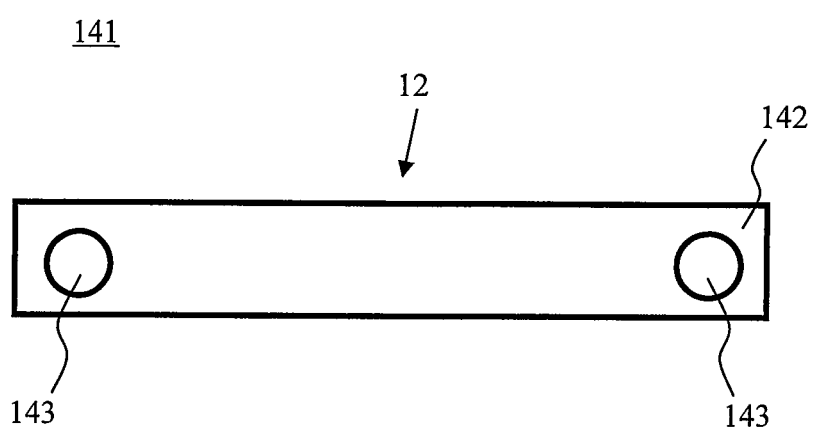
FIG. 17 is a view illustrating a structure example of a rear surface of the unit-type reflecting plate.

FIG. 17 illustrates the rear surface structure of the unit-type reflecting plate 141 that is preferable when the wall surface 131 to which the unit-type reflecting plate 141 is to be attached contains a magnetic material such as iron. In this case, a magnet 143 is placed on the rear surface of the unit-type reflecting plate 141. Alternatively, the unit-type reflecting plate 141 may be attached to the wall surface 131 by engaging a casing main body with an engagement piece placed on the wall surface 131 or may be attached thereto using a screw or a nail.

Figure 18:
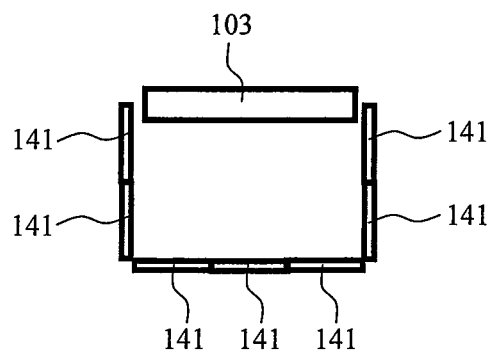
FIG. 18 is a view illustrating a configuration example of a position detecting surface using the combination of the unit-type reflecting plates.
Figure 18:
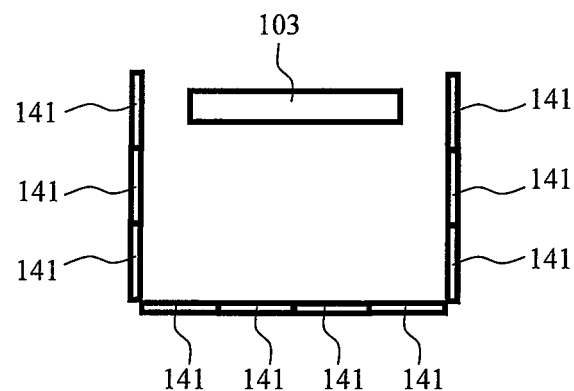
Figure 18:
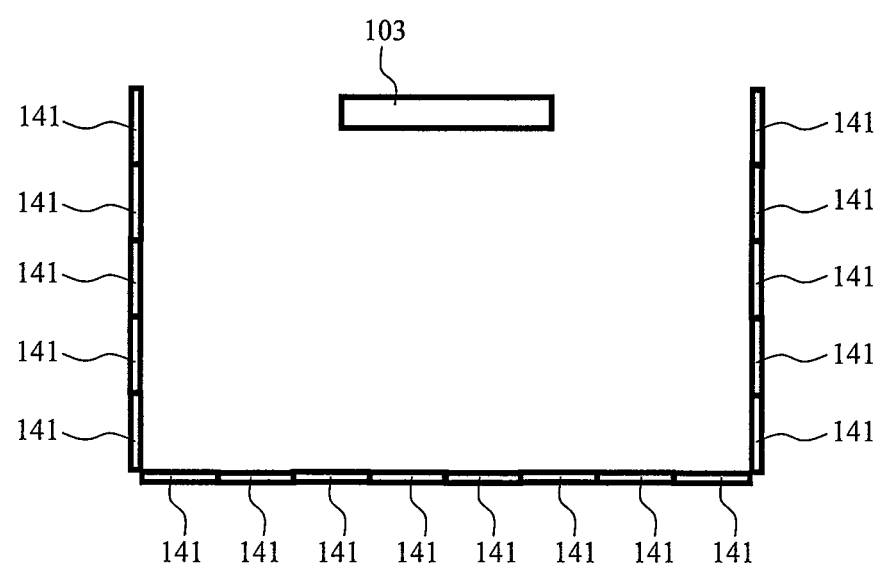

FIG. 18 illustrates a configuration example of the position detecting surface to which the unit-type reflecting plate 141 described above is applied. Note that, the position detecting device 103 is also detachably attached to the wall surface 131, and a magnet is placed as the attachment medium on the rear surface thereof.

The upper part of FIG. 18 illustrates an example in which the lower side of the position detecting surface is formed of three unit-type reflecting plates 141 and the right side and the left side of the position detecting surface are each formed of two unit-type reflecting plates 141. The middle part of FIG. 18 illustrates an example in which the lower side of the position detecting surface is formed of four unit-type reflecting plates 141 and the right side and the left side of the position detecting surface are each formed of three unit-type reflecting plates 141. The lower part of FIG. 18 illustrates an example in which the lower side of the position detecting surface is formed of eight unit-type reflecting plates 141 and the right side and the left side of the position detecting surface are each formed of five unit-type reflecting plates 141.

As described above, the use of the unit-type reflecting plate 141 eliminates the need to prepare the frame body for each size of the position detecting surface, so that the size of the position detecting surface can be freely changed according to the user's needs. In addition, the attachment mediums are placed on the rear surfaces of the unit-type reflecting plate 141 and the position detecting device 103, whereby an arbitrary wall surface can be used as the interactive white board. As a matter of course, because the reflecting plate 12 having the surface structure described in the above-mentioned embodiment is used for the reflecting surface of each unit-type reflecting plate 141, even if the size of the position detecting surface is changed, the position detecting accuracy can be kept high over the entire the position detecting surface.

Figure 19:
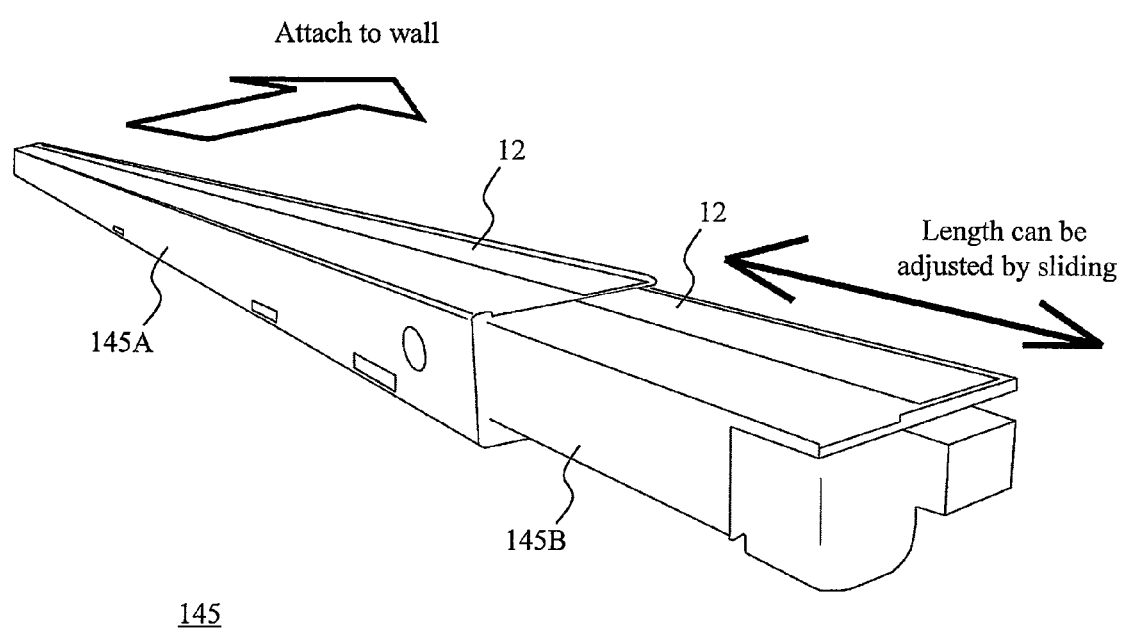
FIG. 19 is a view illustrating a schematic configuration of a unit-type reflecting plate having a mechanism for adjusting a reflecting surface length.

Note that, description is given above of the case where the size of the position detecting surface is adjusted by the placement number of the unit-type reflecting plates 141, and alternatively, as illustrated in FIG. 19, a unit-type reflecting plate 145 having a variable length may be used. The unit-type reflecting plate 145 illustrated in FIG. 19 includes: an outer main body 145A having a U-shape in cross-section in the longitudinal direction; and an inner main body 145B that is housed inside of the outer main body 145A and can be taken out thereof as needed.

As a matter of course, the reflecting plate 12 is attached to a portion of the surface used as the reflecting surface of each of the outer main body 145A and the inner main body 145B in the longitudinal direction, the portion being used as the reflecting surface. In addition, the attachment medium is placed to an attachment surface of each of the outer main body 145A and the inner main body 145B.

For example, in the case where the length of the outer main body 145A is 30 cm, the inner main body 145B can be pulled out by about 25 cm at the longest. That is, the unit-type reflecting plate 145 enables the length of the reflecting plate 12 to be adjusted within a range between 30 cm and 55 cm. Accordingly, limitations depending on a setting place can be flexibly dealt with.

Other Embodiments

Note that, the present invention is not limited to the above-mentioned embodiments, and includes various modified embodiments. For example, the above embodiments are described in detail in order to clearly describe the present invention, and hence the present invention is not necessarily limited to one including all the features described above. Further, part of one embodiment can be replaced with a feature of another embodiment, and a feature of one embodiment can be added to a feature of another embodiment. Still further, a given feature can be added to, deleted from, or replaced with part of a feature of each embodiment.

In addition, a part or entirety of the above-mentioned respective elements, functions, processing units, and processing means may be implemented in the form of hardware such as an integrated circuit. Alternatively, the above-mentioned respective elements, functions, and the like may be implemented by a processor interpreting and executing a program for implementing each function. That is, the above-mentioned respective elements, functions, and the like may be implemented in the form of software. Information on the program, table, and file for implementing each function can be stored in a storing device such as a memory, a hard disk, and a solid state drive (SSD) and a storing medium such as an IC card, an SD card, and a DVD.

In addition, only control lines and information lines that are considered to be necessary for the description are illustrated, and all control lines and information lines that are required in an actual product are not necessarily illustrated. In actuality, almost all elements may be considered to be connected to each other.

DESCRIPTION OF SYMBOLS 1 reflecting frame
11 reflecting surface
12 reflecting plate (embodiment)
13 base layer
14 convex pattern
15 glass bead
23 concave pattern
31 position detecting surface
32 position detecting device
33 reflecting plate (prism structure)
100 interactive white board system
101 coordinate input device
102 instruction object
103 position detecting device
104 reflecting frame
105 arithmetic device
106 display device
111 control device
112 image-pickup unit
113 image-pickup unit
121 image sensor
122 LED
131 wall surface
141 unit-type reflecting plate
142 main body
143 magnet
145 unit-type reflecting plate
145A outer main body
145B inner main body

What is claimed is:

1. A reflecting plate comprising a reflecting surface that retro-reflects illumination light emitted from an optical position detecting device towards the position detecting device that includes a light source,
the reflecting plate further comprising:
    a surface structure in which a concavo-convex pattern having the same triangle shape in cross-section in a width direction of the reflecting plate continuously appears in a longitudinal direction thereof; and
    a retro-reflecting layer in which reflecting beads are evenly placed on at least one oblique surface of the concavo-convex pattern.

2. The reflecting plate according to claim 1,
wherein the reflecting surface is formed on a surface of a pattern that is convex to a base surface of the reflecting plate.

3. The reflecting plate according to claim 1,
wherein the reflecting surface is formed on a surface of a pattern that is concave to a base surface of the reflecting plate.

4. The reflecting plate according to claim 1,
wherein a height of the triangle is equal to or less than 1.2 mm.

5. The reflecting plate according to claim 1,
wherein the triangle is an isosceles triangle.

6. The reflecting plate according to claim 1,
wherein the triangle is left-right asymmetrical.

7. The reflecting plate according to claim 1, comprising a freely combinable unit-type reflecting plate.

8. A reflecting frame comprising a reflecting surface that is placed along each of three sides of a left side, a lower side, and a right side of a position detecting surface, the reflecting surface retro-reflecting illumination light emitted from an optical position detecting device towards the position detecting device that includes a light source,
    the reflecting frame further comprising the reflecting plate according to claim 1, the reflecting plate being placed on a frame body of each of at least the left side and the right side of the position detecting surface.

* * * * *